(12) United States Patent
Lu et al.

(10) Patent No.: US 12,389,065 B1
(45) Date of Patent: Aug. 12, 2025

(54) DATA CACHING

(71) Applicant: MOORE THREADS TECHNOLOGY CO., LTD., Beijing (CN)

(72) Inventors: Ziwei Lu, Beijing (CN); Xianhua Liu, Beijing (CN); Fengxiang Ma, Beijing (CN); Keshou Wu, Beijing (CN)

(73) Assignee: MOORE THREADS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 19/104,779

(22) PCT Filed: Aug. 21, 2023

(86) PCT No.: PCT/CN2023/113941
§ 371 (c)(1),
(2) Date: Feb. 19, 2025

(87) PCT Pub. No.: WO2024/037650
PCT Pub. Date: Feb. 22, 2024

(30) Foreign Application Priority Data

Aug. 19, 2022 (CN) .......................... 202210999430.3

(51) Int. Cl.
*H04N 21/433* (2011.01)
(52) U.S. Cl.
CPC .............................. *H04N 21/4331* (2013.01)
(58) Field of Classification Search
None
See application file for complete search history.

(56) References Cited

U.S. PATENT DOCUMENTS

| 7,260,704 | B2 * | 8/2007 | Cooksey | G06F 12/0215 |
| | | | | 712/237 |
| 2008/0091921 | A1 * | 4/2008 | Abuaiadh | G06F 9/383 |
| | | | | 712/207 |

(Continued)

FOREIGN PATENT DOCUMENTS

| CN | 101692229 A | 4/2010 |
| CN | 103347075 B | 6/2016 |

(Continued)

OTHER PUBLICATIONS

International Search Report of the International Searching Authority for State Intellectual Property Office of the People's Republic of China in PCT application No. PCT/CN2023/113941 issued on Nov. 27, 2023, which is an international application to which this application claims priority.

(Continued)

*Primary Examiner* — Heather R Jones
(74) *Attorney, Agent, or Firm* — BSJ & SUN LLC

(57) ABSTRACT

The present application provides a data caching method and a chip. The chip includes a plurality of video data sub-processors for caching different data types of video data respectively and a data prefetcher. The method includes: determining target video data according to identification information of a video data sub-processor of to-be-cached video data; determining a data storage address of the target video data in an external memory; and obtaining, by the data prefetcher, corresponding target video data from the external memory according to the data storage address. The present application may improve the data caching efficiency, reduce the data access, improve the computational efficiency of video data processing, and reduce the power consumption.

15 Claims, 7 Drawing Sheets

(56) References Cited

U.S. PATENT DOCUMENTS

| | | | |
|---|---|---|---|
| 2016/0062916 A1* | 3/2016 | Das | G06F 12/1027 711/133 |
| 2018/0103260 A1 | 4/2018 | Chuang et al. | |
| 2019/0163641 A1* | 5/2019 | Cooray | G06F 12/1027 |
| 2020/0133875 A1* | 4/2020 | Jia | G06F 12/10 |
| 2021/0110089 A1* | 4/2021 | Chen | G06V 20/64 |

FOREIGN PATENT DOCUMENTS

| | | | |
|---|---|---|---|
| CN | 107077334 | A | 8/2017 |
| CN | 107615765 | A | 1/2018 |
| CN | 108369509 | A | 8/2018 |
| CN | 112231243 | A | 1/2021 |
| CN | 112256599 | A | 1/2021 |
| CN | 112887512 | A | 6/2021 |
| CN | 115086706 | A | 9/2022 |
| WO | 2021057325 | A | 4/2021 |

OTHER PUBLICATIONS

China National intellectual Property Administration, first Office Action of Chinese application 202210999430.3 issued on Sep. 27, 2022, which is foreign counterpart application of this US application to which this application claims priority.

China National intellectual Property Administration, Notification to Grant Patent Right for Invention of Chinese application No. 202210999430.3 issued on Nov. 2, 2022, which is foreign counterpart application of this US application.

* cited by examiner

DATA CACHING

CROSS-REFERENCE TO RELATED APPLICATIONS

This application is a national stage of International PCT Application No. PCT/CN2023/113941 filed on Aug. 21, 2023, which claims priority to Chinese patent application No. 202210999430.3 filed on Aug. 19, 2022, the entire contents of which are incorporated herein by reference.

TECHNICAL FIELD

The present disclosure relates to the technical field of video data processing, and in particular to a method and a chip for data caching.

BACKGROUND

In the related art, for a video data processor in a chip, on the one hand, to reduce data access, data that has been already requested is usually cached; on the other hand, to reduce the calculation waiting time and improve the calculation efficiency of video data, a part of video data is usually prefetched from an external memory for subsequent data processing.

SUMMARY

An object of the present application is to provide a data caching method, which can improve data caching efficiency, reduce data access, improve computational efficiency of video data processing, and reduce power consumption. Another object of the present application is to provide a chip. Yet another object of the present application is to provide a computer device. Yet another object of the present application is to provide a readable medium. Yet another object of the present application is to provide a computer program product.

To achieve the above objectives, in an aspect, the present application discloses a data caching method, being applied to a chip, where the chip includes a plurality of video data sub-processors for caching different data types of video data respectively and a data prefetcher, and the method includes: determining target video data according to identification information of a video data sub-processor of to-be-cached video data; determining a data storage address of the target video data in an external memory; and obtaining, by the data prefetcher, corresponding target video data from the external memory according to the data storage address.

In some embodiments, the method further includes: storing at least part of the target video data to a data prefetcher corresponding to the video data sub-processor.

In some embodiments, the target video data includes the to-be-cached video data and prefetching video data, the data prefetcher includes a chip system-level cache and a video system-level cache, and the method further includes: storing the to-be-cached video data in the target video data to a corresponding video data sub-processor and/or video system-level cache, and storing the prefetching video data in the target video data to a corresponding chip system-level cache and/or video system-level cache.

In some embodiments, determining the target video data according to the identification information of the video data sub-processor of the to-be-cached video data includes: determining a data type according to the identification information of the video data sub-processor of the to-be-cached video data; determining a data format and a prefetching data amount according to the data type; and determining the target video data to be obtained according to the data format and the prefetching data amount.

In some embodiments, the data type includes a three-dimensional space linear horizontal increasing type, and determining the data format and the prefetching data amount according to the data type includes: determining the data format according to the data type; and determining the prefetching data amount according to the data format and a specified horizontal step size and data amount of the three-dimensional space linear horizontal increasing type.

In some embodiments, the target video data includes the to-be-cached video data and prefetching video data, the data prefetcher includes a chip system-level cache and a video system-level cache, and the method further includes: storing the to-be-cached video data in the target video data to a corresponding video system-level cache; and storing the prefetching video data in the target video data to a corresponding video system-level cache.

In some embodiments, the data type includes a three-dimensional space adjacent dependency type, and determining the data format and the prefetching data amount according to the data type includes: determining the data format according to the data type; and determining the prefetching data amount according to the data format and a specified adjacent orientation of the three-dimensional space adjacent dependency type.

In some embodiments, the target video data includes the to-be-cached video data and prefetching video data, the data prefetcher includes a chip system-level cache and a video system-level cache, and the method further includes: storing the to-be-cached video data in the target video data to a corresponding video system-level cache; and storing the prefetching video data in the target video data to a corresponding video system-level cache.

In some embodiments, the data type includes a finite three-dimensional space mutation type, and determining the data format and the prefetching data amount according to the data type includes: determining the data format according to the data type; and determining the prefetching data amount according to the data format and a mutation address of the finite three-dimensional space mutation type.

In some embodiments, the target video data includes the to-be-cached video data and prefetching video data, the data prefetcher includes a chip system-level cache and a video system-level cache, and the method further includes: storing the to-be-cached video data in the target video data to a corresponding video system-level cache; and storing the prefetching video data in the target video data to a corresponding chip system-level cache.

In some embodiments, obtaining the corresponding target video data from the external memory according to the data storage address includes: generating, by the video system-level cache, a data acquisition request according to the data storage address and sending, by the video system-level cache, the data acquisition request to the chip system-level cache; and acquiring, by the chip system-level cache, video data in the data storage address from the external memory according to the data acquisition request to obtain the target video data.

In some embodiments, storing the to-be-cached video data in the target video data to the corresponding video data sub-processor and/or video system-level cache, and storing the prefetching video data in the target video data to the corresponding chip system-level cache and/or video system-level cache includes: determining a replacement algorithm according to the identification information; and according to the replacement algorithm, storing the to-be-cached video data in the target video data to the corresponding video data sub-processor and/or video system-level cache, and storing the prefetching video data in the target video data to the corresponding chip system-level cache and/or video system-level cache.

In some embodiments, the method further includes: according to a prefetching video data acquisition request transmitted by a video data sub-processor, determining a cache area in the data prefetcher corresponding to the video data sub-processor; acquiring target video data prefetched in the cache area according to the prefetching video data acquisition request; and caching at least part of the target video data to the video data sub-processor.

The present application further discloses a chip, including a plurality of video data sub-processors for caching different data types of video data respectively, a central controller and a data prefetcher; the central controller is configured to determine target video data according to identification information of a video data sub-processor of to-be-cached video data; and determine a data storage address of the target video data in an external memory; and the data prefetcher is configured to obtain corresponding target video data from the external memory according to the data storage address.

The present application further discloses a computer device, including a memory, a processor and a computer program stored in the memory and executable on the processor, where the processor implements the above methods when executing the computer program.

The present application further discloses a computer-readable medium storing a computer program, where the computer program is executed by a processor to implement the above methods.

The present application further discloses a computer program product including a computer program, where the computer program is executed by a processor to implement the above methods.

In the embodiments of the present application, the chip includes a plurality of video data sub-processors for caching different data types of video data respectively and a data prefetcher. Accordingly, in the data caching method based on the chip of the embodiments of the present application, the target video data may be determined according to the identification information of the video data sub-processor of the to-be-cached video data, the data storage address of the target video data in the external memory may be determined, and the corresponding target video data is obtained by the data prefetcher from the external memory according to the data storage address. Therefore, the chip of the present application includes different video data sub-processors to store different data types of target video data, and the data type of the to-be-cached video data may be determined according to the identification information of the video data sub-processor, so that the target video data to be obtained may be determined to acquire the target video data from the external memory. By using the identification information corresponding to the data type to distinguish the video data from the chip system data, the scheme of the present application can effectively improve the data cache efficiency and reduce the data access, thereby further improving the calculation efficiency of video data processing and reducing the power consumption.

DETAILED DESCRIPTION OF THE EMBODIMENTS

Figure 1:
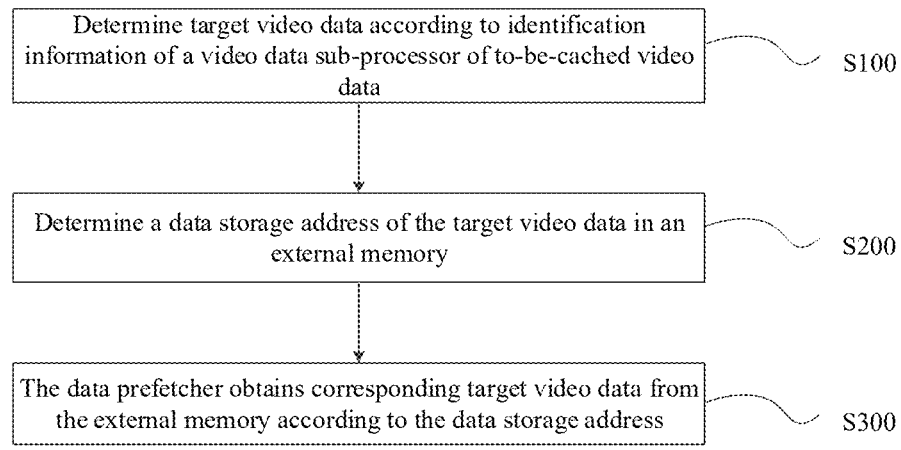
FIG. 1 is a flowchart of a data caching method according to a specific embodiment of the present application.

A video data processor in an existing chip may obtain video data stored in an external memory and process the video data, and may cache or prefetch a part of video data for subsequent video data processing, thus improving the calculation efficiency of video data processing and reducing the data access. The video data processing includes processing video data sequentially or separately by sub-modules with different functions in the video data processor. For example, the video data processor may include sub-modules for video display processing and video encoding and decoding. In addition, the chip may also implement other chip system-level functions, and therefore, the chip further stores chip system data.

In the related art, the video data read by the video data processor may overlap in time and space, and an acquisition speed of video data that has been already requested may be improved by caching the data that has been already requested, so that the access to the video data is reduced to a certain extent. The video data read by the video data processor may have incremental characteristics in time and space. Prefetching a part of video data for subsequent video data processing may reduce the calculation waiting time of subsequent video data processing and improve the calculation efficiency.

Because the storage space of the chip is generally small, the chip may replace the cached or prefetching video data with new video data based on a replacement algorithm or delete a part of the cached data. The three main replacement algorithms commonly used are as follows.

1. Random (RAND) algorithm: because there are more blocks for storing video data in a main memory than in a Cache, when a block is to be invoked from the main memory to the Cache, there will be a situation in which a group of (or one) Cache blocks to which the block is mapped have all been occupied. In this case, it is necessary to randomly vacate one of the blocks to accommodate the newly invoked block.

2. First In First Out (FIFO) algorithm: following a principle of first in first out, if the Cache is filled currently, a block that entered the Cache the earliest is replaced.

3. Least Recently Used (LRU) algorithm: a least recently used block is replaced, that is, a block for which the longest period of time has elapsed since it was last accessed is replaced.

However, the existing chip generally adopts a unified cache mechanism from a perspective of chip system universality, and adopts a fixed replacement algorithm to process the video data in the cache, without considering different characteristics of chip system data and video data (compared with the video data, the chip system data occupies a large storage space, has no prefetching mechanism, and has long data delay). As a result, the storage efficiency of the video data processor is low, and the cache storage space of the chip cannot even be effectively utilized in different scenarios. In addition, the existing chip does not take into account the data arrangement characteristics required by the video data processor, and the data storage manner of video data caching or prefetching is not flexible. In other words, the video data processor generally subdivides a variety of video data arrangement formats, such as line scanning data arrangement, block data arrangement, code stream sequence arrangement, upper and lower data sequence arrangement, left and right data sequence arrangement, and front and rear frames in the same position sequence arrangement. Each format is stored in a separate memory, so that a data amount stored in each format of video data is related to a space occupied by the format and cannot be flexibly configured.

In view of the above, in the present application, the chip is configured to have a multi-level storage structure including a data prefetcher and a video data processor, the to-be-cached video data is returned to the video data processor, and the prefetching video data is stored to the data prefetcher. Thus, a larger storage space can be provided for the cached or prefetching video data, so that the storage manner of the video data is more flexible.

In the present application, a data type may be determined based on identification information, and a range of target video data may be determined according to the data type. Thus, the video data can be distinguished from the chip system data, thereby effectively improving the data caching efficiency and reducing the data access.

In addition, in the present application, the data type may be determined based on the identification information, and different replacement algorithms are set for different data types, thus effectively improving the storage and replacement efficiency of video data.

First, the basic principle of the present application will be explained in detail. This embodiment discloses a data caching method, which may be applied to a chip. The chip may implement at least one data processing function such as 2D graphics processing, 3D graphics processing and video data processing. The chip may include a data prefetcher and a plurality of video data sub-processors for caching different data types of video data respectively. As shown in FIG. 1, in this embodiment, the method includes the following steps.

At step S100, target video data is determined according to identification information of a video data sub-processor of to-be-cached video data.

At step S200, a data storage address of the target video data in an external memory is determined.

At step S300, corresponding target video data is obtained, by the data prefetcher, from the external memory according to the data storage address.

In the present application, the chip includes a data prefetcher and a plurality of video data sub-processors for caching different data types of video data respectively. Accordingly, in the data caching method based on the chip of the embodiments of the present application, the target video data may be determined according to the identification information of the video data sub-processor of the to-be-cached video data, and the data storage address of the target video data in the external memory may be determined, and the corresponding target video data may be obtained from the external memory by the data prefetcher according to the data storage address. Therefore, in the present application, the chip includes different video data sub-processors to store different data types of target video data, and the data type of the to-be-cached video data may be determined according to the identification information of the video data sub-processor, so that the target video data to be obtained may be determined to acquire the target video data from the external memory. In the scheme of the present application, by using the identification information corresponding to the data type to distinguish the video data from the chip system data, the data cache efficiency can be effectively improved and the data access can be reduced, thereby further improving the calculation efficiency of video data processing and reducing the power consumption.

Figure 2:
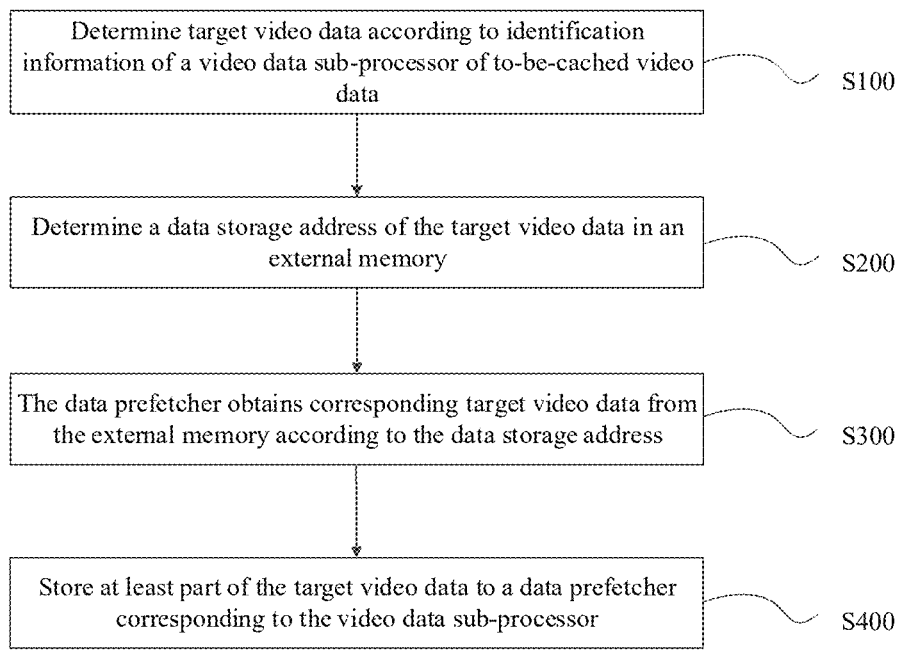
FIG. 2 is a flowchart of target video data storage of a data caching method according to a specific embodiment of the present application.

In a preferred embodiment, as shown in FIG. 2, the method further includes step S400: storing at least part of the target video data to a data prefetcher corresponding to the video data sub-processor.

In this preferred embodiment, the chip is configured to have a two-level storage structure including a video data sub-processor and a data prefetcher, so that at least part of the target video data can be stored to the data prefetcher. Thus, a larger storage space can be provided for the cached or prefetching video data, and the storage manner of video data is more flexible. Of course, in other embodiments, all the obtained target video data may also be returned to corresponding video data sub-processors, which may be set by a person skilled in the art according to the actual requirements, and the present application is not limited to this.

Figure 3:
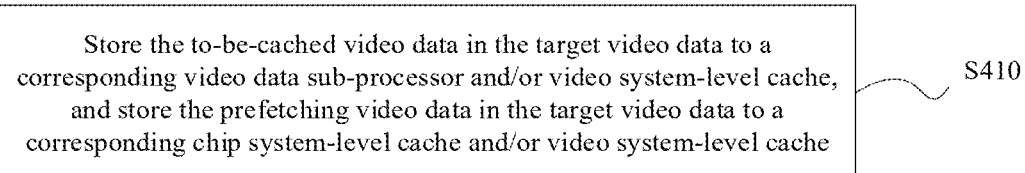
FIG. 3 is a flowchart of step S400 of a data caching method according to a specific embodiment of the present application.

In a preferred embodiment, the target video data includes to-be-cached video data and prefetching video data, and the data prefetcher includes a chip system-level cache and a video system-level cache. As shown in FIG. 3, the step S400 further includes step S410.

At step S410, the to-be-cached video data in the target video data is stored to a corresponding video data sub-processor and/or video system-level cache, and the prefetching video data in the target video data is stored to a corresponding chip system-level cache and/or video system-level cache.

In an embodiment, the target video data may include to-be-cached video data and prefetching video data. The to-be-cached video data refers to video data that a video data sub-processor of the to-be-cached video data currently needs to acquire, and the prefetching video data refers to video data that a video data sub-processor may subsequently need to acquire as determined based on the data type.

In this preferred embodiment, the chip is configured to have a multi-level storage structure including a video data sub-processor, a chip system-level cache and a video system-level cache, so as to support to adopt different cache strategies for different data types of video data. Different cache strategies may be preset for different data types, so that when a data type is determined according to identification information, a corresponding cache strategy may be determined at the same time.

In an embodiment, for different data types of to-be-cached video data, based on a corresponding cache strategy, to-be-cached video data may be directly sent to a corresponding video data sub-processor or stored to a video system-level cache of a data prefetcher, and subsequently, the video data sub-processor may directly request and obtain the to-be-cached video data from the video system-level cache. Or a part of the to-be-cached video data may be stored to a corresponding video data sub-processor and the other part of the to-be-cached video data may be stored to a corresponding video system-level cache. For the prefetching video data, the prefetching video data may be stored to the video system-level cache or the chip system-level cache of the data prefetcher based on the corresponding cache strategy, and subsequently, the video data sub-processor may directly request and obtain the prefetching video data from the video system-level cache or the chip system-level cache. Or a part of the prefetching video data may be stored to a corresponding video system-level cache and the other part of the prefetching video data may be stored to a corresponding chip system-level cache. Therefore, the chip with a multi-level storage structure may provide more storage space for the cached or prefetching video data, and the storage manner of video data is more flexible.

Of course, in other embodiments, the to-be-cached video data in the target video data may be stored to the chip system-level cache, or the prefetching video data in the target video data may be directly stored to the corresponding video data sub-processor, which can be set by a person skilled in the art according to actual requirements, and the present application is not limited to this.

Figure 4:
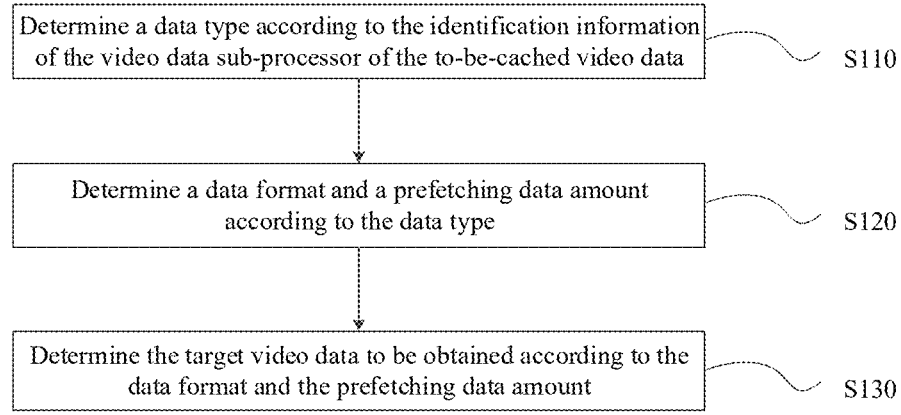
FIG. 4 is a flowchart of step S100 of a data caching method according to a specific embodiment of the present application.

In a preferred embodiment, as shown in FIG. 4, the step S100 may include the following steps.

At step S110, a data type is determined according to the identification information of the video data sub-processor of the to-be-cached video data.

At step S120, a data format and a prefetching data amount is determined according to the data type.

At step S130, the target video data to be obtained is determined according to the data format and the prefetching data amount.

In this preferred embodiment, the corresponding identification information is preset for different data types of video data sub-processors. Therefore, for a video data sub-processor of the to-be-cached video data, identification information corresponding to the video data sub-processor may be obtained, and a data type of video data to be cached by the video data sub-processor may be determined according to the identification information. For example, the data type may include at least one of a three-dimensional space linear horizontal increasing type, a three-dimensional space adjacent dependency type, or a finite three-dimensional space mutation type.

Therefore, different data types of video data have different data formats, and a data format and a prefetching data amount may be determined according to the determined data type of the video data sub-processor. Furthermore, a range of target video data stored in the external memory of the to-be-cached video data and the prefetching video data may be determined according to the data type, so that the target video data may be obtained from the external memory.

In a specific example, the identification information may include at least one of a data type, prefetching data information or a prefetching address step size. According to the data type, the data format of the to-be-cached video data or the prefetching video data may be determined. According to the prefetching data information and the prefetching address step size, a prefetching data amount may be determined. One unit of video data corresponding to the data format is the to-be-cached video data, and the prefetching data amount of video data of is the prefetching video data. The to-be-cached video data and the prefetching video data are the target video data to be obtained from the external memory.

In the present application, according to characteristics of data types of video data cached in different video data sub-processors, different video data caching and prefetching mechanisms are set through identification information, that is, the format and the range of the to-be-cached video data and the prefetching video data are set by setting the identification information of the video data sub-processor. Furthermore, combined with the chip having a multi-level cache structure including the data prefetcher and the video data sub-processor, the flexible storage of data in the chip is achieved, and the storage space of video data is expanded, so that the data access bandwidth is reduced to a greater extent. Thereby, the delay of data access is reduced, the data use efficiency is improved, further the calculation efficiency is improved and the power consumption is reduced.

Figure 5:
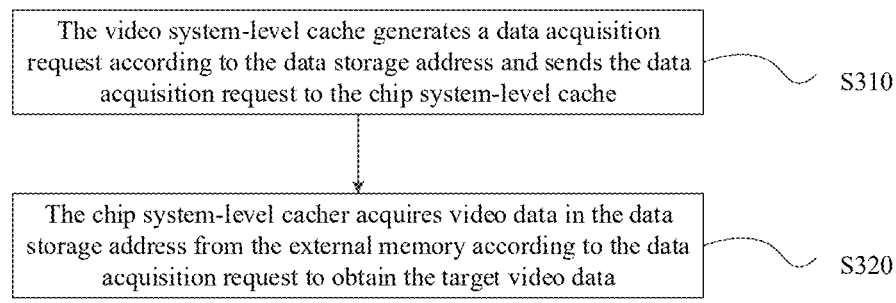
FIG. 5 is a flowchart of step S300 of a data caching method according to a specific embodiment of the present application.

In a preferred embodiment, the data prefetcher includes a chip system-level cache and a video system-level cache. As shown in FIG. 5, the step S300 may include the following steps.

At step S310, the video system-level cache generates a data acquisition request according to the data storage address and sends the data acquisition request to the chip system-level cache.

At step S320, the chip system-level cache acquires video data in the data storage address from the external memory according to the data acquisition request to obtain the target video data.

It can be understood that in this preferred embodiment, the data prefetcher includes a chip system-level cache and a video system-level cache. The chip system-level cache may be configured to store the chip system data of the whole chip, further may be configured to store the prefetching video data prefetched by each video data sub-processor, and may further be docked with an external device (for example, an external memory) to realize data interaction between the chip and the external device. The video system-level cache may be configured to store the prefetching video data prefetched by each video data sub-processor.

Therefore, when the video data sub-processor needs to cache video data, each video data sub-processor may send a request for caching video data to the video system-level cache. And after receiving the request for caching video data transmitted by a video data sub-processor, the video system-level cache obtains the identification information of the video data sub-processor to obtain the target video data.

Generally, the data stored at all addresses in the external memory is pre-stored in the chip, so that a data storage address of target video data in the external memory may be determined according to the target video data and the pre-stored data in the external memory. Therefore, a data acquisition request may be generated according to the data storage address and transmitted to the chip system-level cache, and the target video data stored in the external memory may be acquired through data interaction between the chip system-level cache and the external memory. Of course, in practical application, the data storage address of the target video data in the external memory may further be determined by other ways, and the person skilled in the art can set the acquisition method of the data storage situation of the external memory according to the actual requirements, and the present application is not limited here.

In an example, the external memory is preferably a nonvolatile memory, including but not limited to DDR (Double Data Rate) type memory.

In a specific example, the bidirectional transmission of information between the chip system-level cache and the video system-level cache is realized through a bus, so the data acquisition request generated by the video system-level cache may be transmitted to the chip system-level cache through the bus. Thus, the chip system-level cache may access the external memory to acquire the target video data according to the data acquisition request.

Figure 6:
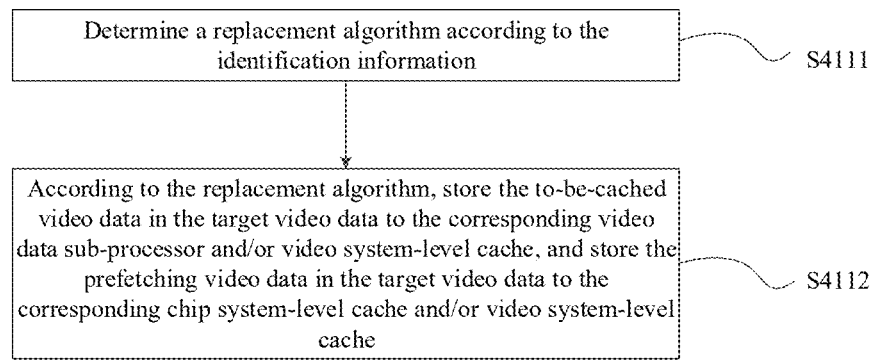
FIG. 6 is a flowchart of step S410 of a data caching method according to a specific embodiment of the present application.

In a preferred embodiment, as shown in FIG. 6, the step S410 may include the following steps.

At step S4111, a replacement algorithm is determined according to the identification information.

At step S4112, according to the replacement algorithm, the to-be-cached video data in the target video data is stored to the corresponding video data sub-processor and/or video system-level cache, and the prefetching video data in the target video data is stored to the corresponding chip system-level cache and/or video system-level cache.

In an example, the identification information may further include replacement algorithms set for different video data sub-processors. Therefore, different cache data replacement strategies may be set for different data types by setting the replacement algorithms in the identification information. That is, the replacement manners of target video data of different types of video data may be subdivided through the replacement algorithms, thereby improving the storage flexibility of the cached and prefetching video data.

Figure 7:
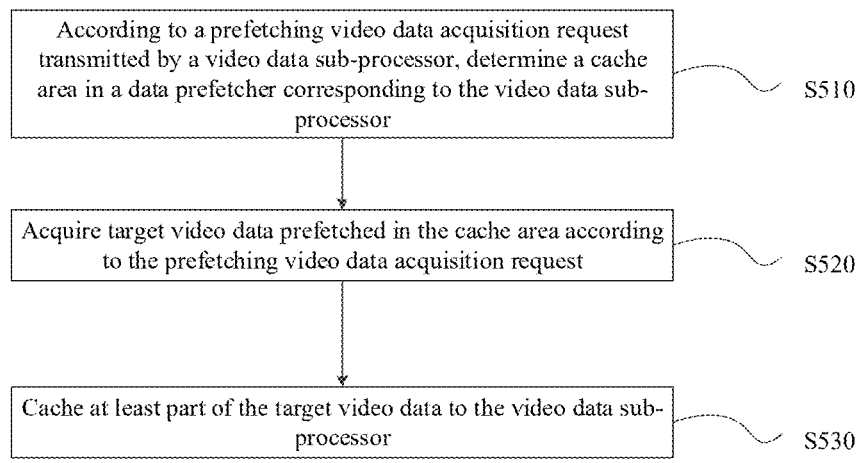
FIG. 7 is a flowchart of step S500 of a data caching method according to a specific embodiment of the present application.

In a preferred embodiment, as shown in FIG. 7, the method further includes step S500, which includes the following steps.

At step S510, according to a prefetching video data acquisition request transmitted by a video data sub-processor, a cache area in a data prefetcher corresponding to the video data sub-processor is determined.

At step S520, target video data prefetched in the cache area is acquired according to the prefetching video data acquisition request.

At step S530, at least part of the target video data is cached to the video data sub-processor.

It can be understood that in the present application, the target video data is stored in the cache area of the data prefetcher corresponding the video data sub-processor. When each video data sub-processor needs to acquire the target video data, the video data sub-processor may send a prefetching data acquisition request to the data prefetcher. The data prefetcher may determine a corresponding cache area according to the prefetching data acquisition request and the video data sub-processor that sent the request, where the cache area is the storage space set in the data prefetcher for storing the target video data corresponding to the data type of the video data sub-processor. Further, at least part of the target video data corresponding to the prefetching data acquisition request may be obtained from the cache area and returned to the video data sub-processor. Therefore, each video data sub-processor may directly obtain the target video data from the data prefetcher of the chip, which can improve the acquisition and processing efficiency of video data.

In a specific example, the target video data includes to-be-cached video data and prefetching video data, and the data prefetcher includes a chip system-level cache and a video system-level cache. The to-be-cached video data in the target video data is stored to the corresponding video data sub-processor and/or video system-level cache, and the prefetching video data in the target video data is stored to the corresponding chip system-level cache and/or video system-level cache. Therefore, at least part of the to-be-cached video data and the prefetching video data of the target video data is stored in at least one of the video system-level cache or the chip system-level cache. When the video data sub-processor needs to acquire the target video data stored in the video system-level cache and/or the chip system-level cache, it may acquire at least part of the target video data stored in the cache area of the video system-level cache and/or the chip system-level cache by generating a prefetching video data acquisition request.

Figure 8:
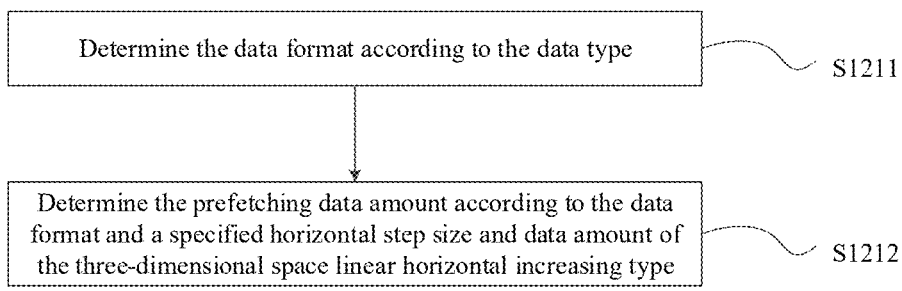
FIG. 8 is a flowchart of step S120 when a data type of a data caching method is a three-dimensional space linear horizontal increasing type according to a specific embodiment of the present application.

In a preferred embodiment, as shown in FIG. 8, the data type includes a three-dimensional space linear horizontal increasing type. The step S120 may include the following steps.

At step S1211, the data format is determined according to the data type.

At step S1212, the prefetching data amount is determined according to the data format and a specified horizontal step size and data amount of the three-dimensional space linear horizontal increasing type.

In an embodiment, when the data type is a three-dimensional space linear horizontal increasing type, the data format of the to-be-cached video data is determined, for example, 8×8 pixel unit of data, and the pixel unit may be an integer multiple of the pixel block in the video data. Furthermore, according to the characteristics of the data type with the three-dimensional space linear horizontal increasing type, the specified horizontal step size and data amount of the data type may be obtained, and the prefetching data amount may be calculated.

In a specific example, the data type cached in the video data sub-processor A is the three-dimensional space linear horizontal increasing type, and the video data sub-processor A needs to cache one unit of data, such as 8×8 pixel unit of data. According to the identification information of the video data sub-processor A, the data with a specified horizontal step size of 16 and a data amount of eight 8×8 pixel units of data may be determined, and then the prefetching data amount may be obtained.

Figure 9:
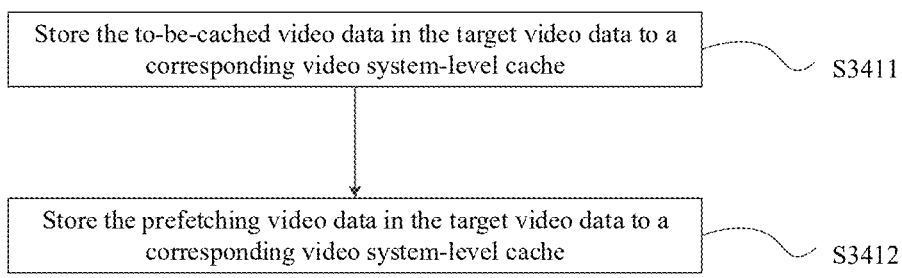
FIG. 9 is a flowchart of step S410 when a data type of a data caching method is a three-dimensional space linear horizontal increasing type according to a specific embodiment of the present application.

In a preferred embodiment, the data prefetcher includes a chip system-level cache and a video system-level cache. As shown in FIG. 9, the step S410 may include the following steps.

At step S3411, the to-be-cached video data in the target video data is stored to a corresponding video system-level cache.

At step S3412, the prefetching video data in the target video data is stored to a corresponding video system-level cache.

It can be understood that when the data prefetcher has a multi-level structure including a chip system-level cache and a video system-level cache, etc., a cache strategy for the prefetching video data may be defined. That is, according to the characteristics of the prefetching video data, the target video data may be set to be stored in at least one of the video data sub-processor, the chip system-level cache or the video system-level cache.

Therefore, in this preferred embodiment, the cache strategy of the target video data of the three-dimensional space linear horizontal increasing type may be set, that is, both the to-be-cached video data and the prefetching video data in the target video data may be stored in the corresponding video system-level cache. In an embodiment, the chip system-level cache may be set to a by-pass mode, so that the target video data returned by the external memory may be directly stored in the video system-level cache, and the chip system-level cache no longer caches the prefetching video data.

Figure 10:
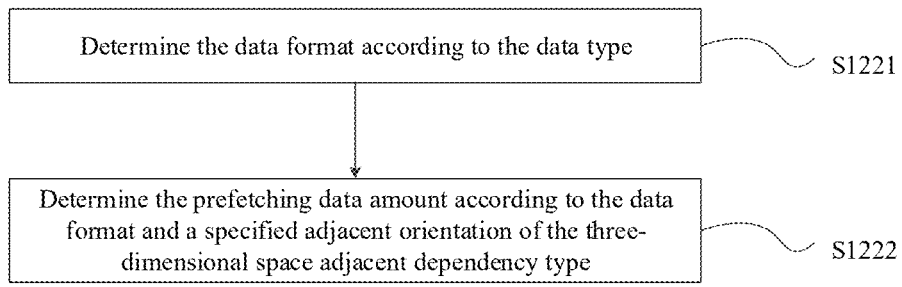
FIG. 10 is a flowchart of step S120 when a data type of a data caching method is a three-dimensional space adjacent dependency type according to a specific embodiment of the present application.

In a preferred embodiment, the data type includes a three-dimensional space adjacent dependency type. As shown in FIG. 10, the step S120 may include the following steps.

At step S1221, the data format is determined according to the data type.

At step S1222, the prefetching data amount is determined according to the data format and a specified adjacent orientation of the three-dimensional space adjacent dependency type.

In an embodiment, when the data type is a three-dimensional space adjacent dependency type, the data format of the to-be-cached video data is determined, for example, it may be 16×16 pixel unit, and the pixel unit may be an integer multiple of the pixel block in the video data. Furthermore, according to the characteristics of the data type of the three-dimensional space adjacent dependency type, the specified adjacent orientation of the data type may be obtained, and the prefetching data amount may be calculated.

In a specific example, the data type cached in the video data sub-processor B is a three-dimensional space adjacent dependency type, and the video data sub-processor B needs to cache data of a current 16×16 pixel unit and adjacent 16×16 pixel units in its adjacent space left, right, above and below. According to the identification information of the video data sub-processor B, it may be determined that the specified adjacent orientation is the adjacent space left, right, above and below, the target video data obtained is data of a current 16×16 pixel unit and five adjacent 16×16 pixel units in its adjacent space left, right, above and below, so as to obtain the to-be-cached video data and the prefetching data amount.

Figure 11:
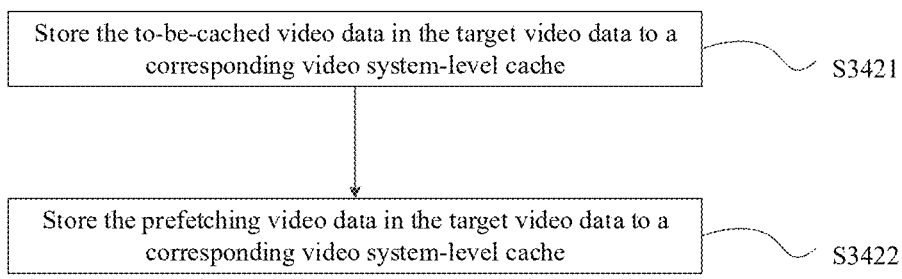
FIG. 11 is a flowchart of step S410 when a data type of a data caching method is a three-dimensional space adjacent dependency type according to a specific embodiment of the present application.

In a preferred embodiment, the data prefetcher includes a chip system-level cache and a video system-level cache. As shown in FIG. 11, the step S410 may include the following steps.

At step S3421, the to-be-cached video data in the target video data is stored to a corresponding video system-level cache.

At step S3422, the prefetching video data in the target video data is stored to a corresponding video system-level cache.

It can be understood that when the data prefetcher has a multi-level structure including a chip system-level cache and a video system-level cache, etc., a cache strategy for the prefetching video data may be defined. That is, according to the characteristics of the prefetching video data, the target video data may be set to be stored in at least one of the video data sub-processor, the chip system-level cache or the video system-level cache.

Therefore, in this preferred embodiment, the cache strategy of the target video data of the three-dimensional space adjacent dependency type may be set, that is, the to-be-cached video data and the prefetching video data in the target video data may be stored in the corresponding video system-level cache. In an embodiment, the chip system-level cache may be set to a by-pass mode, so that the target video data returned by the external memory may be directly stored in the video system-level cache, and the chip system-level cache no longer caches the prefetching video data.

Figure 12:
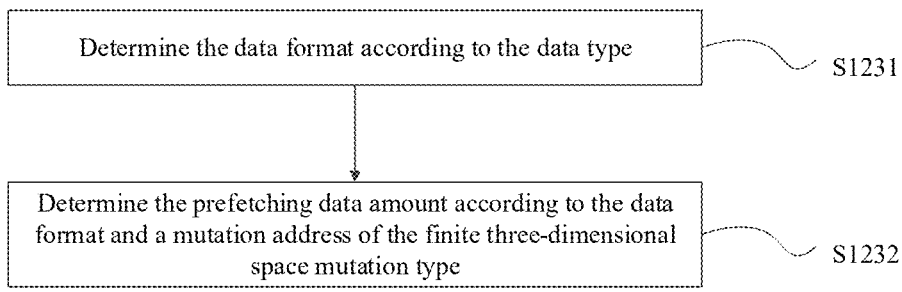
FIG. 12 is a flowchart of step S120 when a data type of a data caching method is a finite three-dimensional space mutation type according to a specific embodiment of the present application.

In a preferred embodiment, the data type includes a finite three-dimensional space mutation type. As shown in FIG. 12, the step S120 may include the following steps.

At step S1231, the data format is determined according to the data type.

At step S1232, the prefetching data amount is determined according to the data format and a mutation address of the finite three-dimensional space mutation type.

In an embodiment, when the data type is a finite three-dimensional space mutation type, the data format of the to-be-cached video data may be determined, for example, it may be 16×16 pixel unit, and the pixel unit may be an integer multiple of the pixel block in the video data. Furthermore, according to the characteristics of the data type with the finite three-dimensional space mutation type, a mutation address of the data type may be obtained, and the prefetching data amount may be calculated.

In a specific example, the data type cached in the video data sub-processor C is a finite three-dimensional space mutation type, and the video data sub-processor C needs to cache data at a mutation address, such as 16×16 pixel unit of data. According to the identification information of the video data sub-processor C, the mutation address of other data may be determined, and then the prefetching data amount may be obtained.

Figure 13:
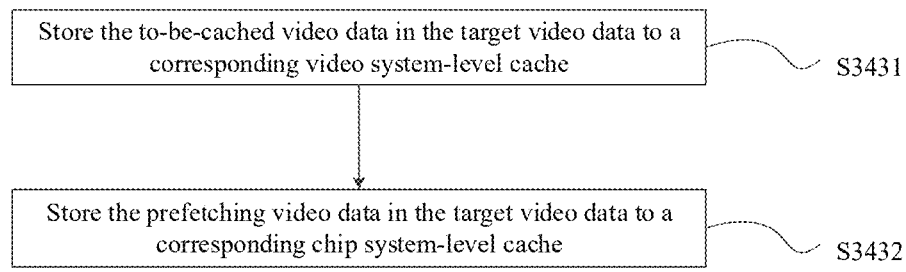
FIG. 13 is a flowchart of step S410 when a data type of a data caching method is a finite three-dimensional space mutation type according to a specific embodiment of the present application.

In a preferred embodiment, the data prefetcher includes a chip system-level cache and a video system-level cache. As shown in FIG. 13, the step S410 may include the following steps.

At step S3431, the to-be-cached video data in the target video data is stored to a corresponding video system-level cache.

At step S3432, the prefetching video data in the target video data is stored to a corresponding chip system-level cache.

It can be understood that when the data prefetcher has a multi-level structure including a chip system-level cache and a video system-level cache, a cache strategy for the prefetching video data may be defined. That is, according to the characteristics of the prefetching video data, the target video data may be set to be stored in at least one of the video data sub-processor, the chip system-level cache or the video system-level cache.

Therefore, in this preferred embodiment, the cache strategy of target video data of the finite three-dimensional space mutation type may be set. That is, the prefetching video data in the target video data is stored to the chip system-level cache, and the to-be-cached video data in the target video data is stored to the video system-level cache, which is convenient for the acquisition and processing of the video data sub-processor.

Figure 14:
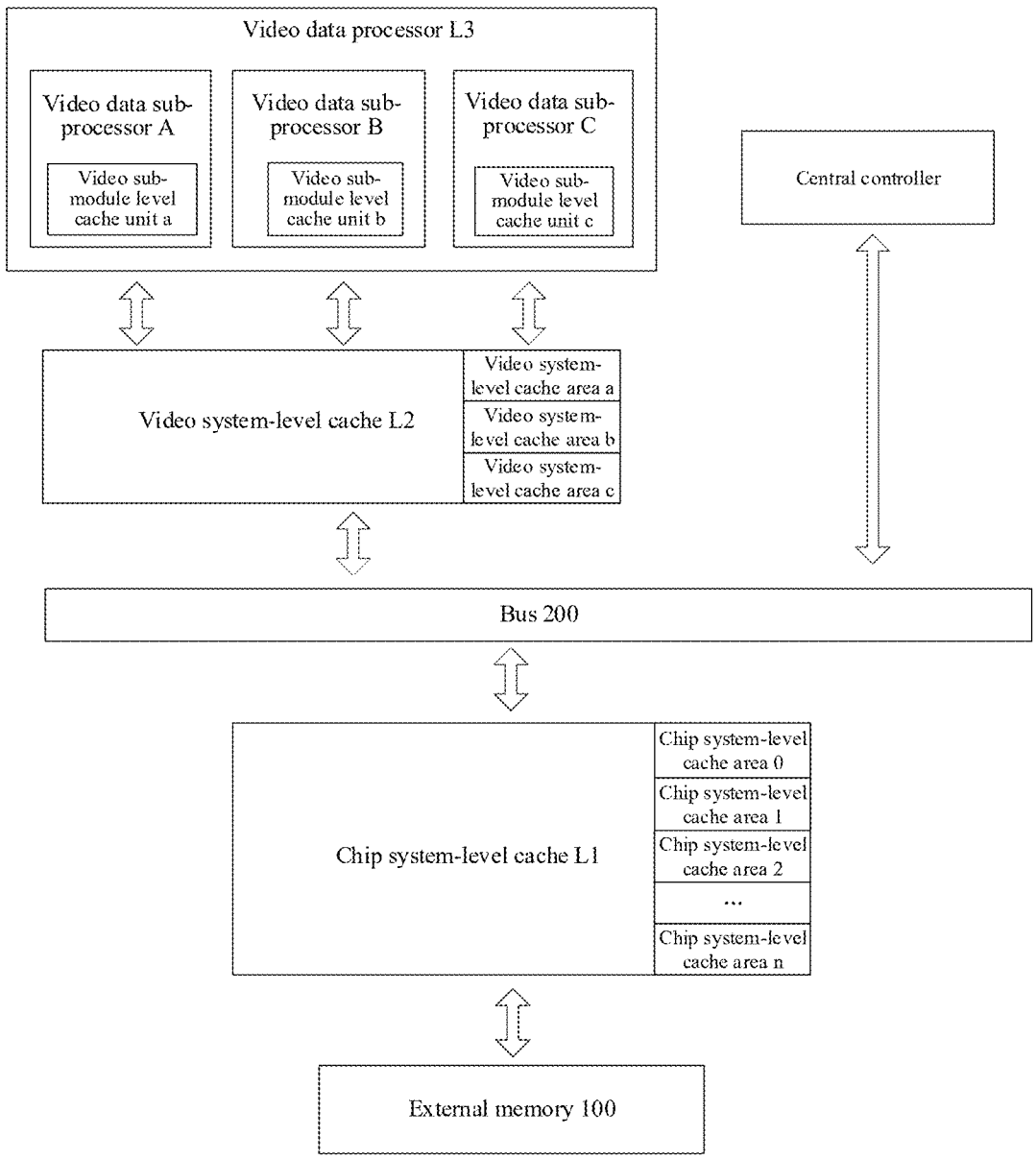
FIG. 14 is a structural diagram of a chip to which a data caching method is applied according to a specific embodiment of the present application.

The present application will be further explained by a specific example. FIG. 14 is a schematic diagram of a specific embodiment of a chip to which the data caching method of the present application is applied. As shown in FIG. 14, in this specific embodiment, the chip includes a central controller, a video data processor L3 and a data prefetcher.

The video data processor L3 may include three video data sub-processors (A, B, C) for caching different types of video data respectively. The data prefetcher may include a chip system-level cache L1 and a video system-level cache L2. The chip system-level cache L1 may interface with an external memory 100 for data interaction with the external memory 100, and may be configured to store the chip system-level data of the whole chip system, and may further be configured to store the prefetching video data. The video system-level cache L2 is mainly configured to store the prefetching video data. In this specific embodiment, the chip system data and the prefetching video data are stored in different modules respectively, and the chip system data and the prefetching video data with different data characteristics are stored separately, thus improving the utilization rate of the chip storage space.

The central controller is configured to determine the data storage address of the target video data according to the identification information of the video data sub-processor of the to-be-cached video data, where the target video data includes the to-be-cached video data and the prefetching video data; acquire corresponding target video data from the external memory 100 according to the data storage address; store the to-be-cached video data to the corresponding video data sub-processor, and store the prefetching video data to the corresponding data prefetcher.

It should be noted that the central controller may be set independently of the video data sub-processor and the data prefetcher, or may be integrated with the video data sub-processor or the data prefetcher, and may further be divided into a plurality of central sub-controllers, which are respectively set in the video data sub-processor and the data prefetcher. For example, the central controller includes a plurality of central sub-controllers respectively set in the video data processor L3, the chip system-level cache L1 and the video system-level cache L2, and the plurality of central sub-controllers jointly realize the functions of the central controller. In practical application, a person skilled in the art can set up the central controller according to the actual requirements, which is not limited in the present application.

In this embodiment, the video data processor L3 of the chip includes three video data sub-processors A, B, and C, where the data type cached by the video data sub-processor A is a three-dimensional space linear horizontal increasing type, the data type cached by the video data sub-processor B is a three-dimensional space adjacent dependency type, and the data type cached by the video data sub-processor C is a finite three-dimensional space mutation type. The video data sub-processors A, B and C may set different identification information to identify the cache strategies of different data types, and use different cache strategies for different data types. Thereby, the cache space is expanded in a targeted way, and at the same time, the universality of the system and video internal cache may be taken into account, improving the caching efficiency of video data. The identification information may include a data type, prefetching data information (such as a data amount), a prefetching address step size and other information.

In an embodiment, as shown in FIG. 14, the video data sub-processor A includes a video sub-module level cache unit a that caches video data of data type a (cache_type_a). The video data sub-processor B includes a video sub-module level cache unit b that caches video data of data type b (cache_type_b). The video data sub-processor C includes a video sub-module level cache unit c that caches video data of data type c (cache_type_c).

In this specific example, the chip video data cache is divided into three levels, the first level is a chip system-level cache L1, the second level is a video system-level cache L2, and the third level is a video data processor L3 including three video data sub-processors (A, B, C). L1 interfaces with the external memory 100 to achieve data interaction with the external memory 100, and may cache the system data and prefetching video data of the whole chip. L2 may be configured to store the prefetching video data. L3 includes the video data sub-processors A, B and C, which may be configured to process and cache video data. L2 is provided with a video system-level cache area a, a video system-level cache area b and a video system-level cache area c, which are configured to store the prefetching video data of the video data sub-processors A, B and C respectively. L1 is provided with cache areas such as a chip system-level cache area 0, a chip system-level cache area 1, a chip system-level cache area 2 . . . a chip system-level cache area n, which may further be configured to store the prefetching video data of the video data sub-processors A, B and C.

When caching video data, the data type stored by the video data sub-processor A is the three-dimensional space linear horizontal increasing type, and the video data sub-processor A needs to obtain one unit of to-be-cached video data, such as 8×8 pixel unit (the unit size may be configured as an integer multiple of pixel block). L2 prefetches in advance the target video data (including the to-be-cached video data and the prefetching video data) with a specified horizontal step size such as 16 and a specified unit of eight 8×8 pixel units according to the identification information of cache_type_a, calculates the storage address of the target video data in the external memory 100, then sends a data acquisition request to L1. And L2 acquires the target video data from the external memory 100 through L1, and stores the target video data in the video system-level cache area a corresponding to the video data sub-processor A. L1 may use a by-pass mode and no longer cache data.

The data type stored by the video data sub-processor B is the three-dimensional space adjacent dependency type, and the video data sub-processor B needs to obtain data of a current 16×16 pixel unit and data of adjacent 16×16 pixel units in its adjacent space left, right, above and below. According to the identification information of cache_type_b, L2 prefetches five 16×16 pixel units of target video data (including the to-be-cached video data and the prefetching video data) in advance, calculates the storage address of the target video data in the external memory 100, then prefetches the target video data from the external memory 100 in advance and stores the target video data in the video sub-module level cache unit b and the video system level cache area b designated by L2. The data of the current 16×16 pixel unit is the to-be-cached video data, and the data of the adjacent 16×16 pixel units in its adjacent space left, right, above and below is the prefetching video data. L1 may use the least recently used replacement algorithm. After the video data sub-processor B obtains the to-be-cached video data, when requesting again to obtain adjacent prefetching video data, the adjacent prefetching video data may be obtained directly from the video system-level cache area b of L2.

The data type stored in the video data sub-processor C is a finite three-dimensional space mutation type, and the video data sub-processor C of L3 needs to obtain the to-be-cached video data at a mutation address with a mutation number of 4 in advance, such as data with a unit of 16×16 pixels. L2 determines the target video data according to the identification information of cache_type_c, and stores the data at a mutation address (to-be-cached video data) in the designated video system-level cache area b. L1 may use the least recently used replacement algorithm to cache the data of another three mutation addresses (prefetching video data). The data replacement algorithm of each level of cache may be flexibly configured according to the manner defined by cache_type_c.

In addition, if the data types of other sub-modules N (not shown in the figure) have no corresponding identification information, the default replacement method of the chip system may be used, and the target video data may be obtained according to the default identification information. For example, other sub-modules may directly send a data acquisition request to L1 through a bus 200 to acquire the target video data from the external memory 100 through L1. Those skilled in the art can set the video data acquisition manners of other sub-modules according to the actual situation, so the details are not repeated here.

In this embodiment, the chip uses L1, L2 and L3 three-level cache structures to hierarchically store different forms of video data with different cache strategies, which can greatly reduce the access to the external memory 100, reduce the access delay, improve the limited memory utilization space and improve the data utilization efficiency. Of course, in other embodiments, the chip may adopt a cache structure of more than three levels, and define the target video data that each video data sub-processor needs to acquire and the cache strategy and replacement algorithm of each level in the cache structure of more than three levels and other information through the identification information, so as to further improve the video data cache flexibility of the chip, the cache space utilization efficiency and the data utilization efficiency. The related technical scheme based on the concept of the present disclosure should also be within the protection scope of the present application.

Based on the same principle, this embodiment further discloses a chip. The chip includes a plurality of video data sub-processors for caching different data types of video data respectively, a central controller and a data prefetcher.

The central controller is configured to determine target video data according to identification information of a video data sub-processor of to-be-cached video data; and determine a data storage address of the target video data in an external memory. The data prefetcher obtains corresponding target video data from the external memory according to the data storage address.

In a preferred embodiment, the central controller is further configured to store at least part of the target video data to a data prefetcher corresponding to the video data sub-processor.

In a preferred embodiment, the target video data includes the to-be-cached video data and prefetching video data, and the data prefetcher includes a chip system-level cache and a video system-level cache. The central controller is further configured to store the to-be-cached video data in the target video data to a corresponding video data sub-processor and/or video system-level cache, and store the prefetching video data in the target video data to a corresponding chip system-level cache and/or video system-level cache.

In a preferred embodiment, the central controller is further configured to determine a data type according to the identification information of the video data sub-processor of the to-be-cached video data; determine a data format and a prefetching data amount according to the data type; and determine the target video data to be obtained according to the data format and the prefetching data amount.

In a preferred embodiment, the data type includes a three-dimensional space linear horizontal increasing type, and the central controller is further configured to determine the data format according to the data type; determine the prefetching data amount according to the data format and a specified horizontal step size and data amount of the three-dimensional space linear horizontal increasing type.

In a preferred embodiment, the central controller is further configured to store the to-be-cached video data in the target video data to a corresponding video system-level cache; and store the prefetching video data in the target video data to a corresponding video system-level cache.

In a preferred embodiment, the data type includes a three-dimensional space adjacent dependency type, and the central controller is further configured to determine the data format according to the data type, and determine the prefetching data amount according to the data format and a specified adjacent orientation of the three-dimensional space adjacent dependency type.

In a preferred embodiment, the central controller is further configured to store the to-be-cached video data in the target video data to a corresponding video system-level cache; and store the prefetching video data in the target video data to a corresponding video system-level cache.

In a preferred embodiment, the data type includes a finite three-dimensional space mutation type, and the central controller is further configured to determine the data format according to the data type; and determine the prefetching data amount according to the data format and a mutation address of the finite three-dimensional space mutation type.

In a preferred embodiment, the central controller is further configured to store the to-be-cached video data in the target video data to a corresponding video system-level cache; and store the prefetching video data in the target video data to a corresponding chip system-level cache.

In a preferred embodiment, the video system-level cache generates a data acquisition request according to the data storage address and sends the data acquisition request to the chip system-level cache.

The chip system-level cache acquires video data in the data storage address from the external memory according to the data acquisition request to obtain the target video data.

In a preferred embodiment, the central controller is further configured to determine a replacement algorithm according to the identification information; and according to the replacement algorithm, store the to-be-cached video data in the target video data to the corresponding video data sub-processor and/or video system-level cache, and store the prefetching video data in the target video data to the corresponding chip system-level cache and/or video system-level cache.

In a preferred embodiment, the central controller is further configured to determine a cache area in a data prefetcher corresponding to a video data sub-processor according to a prefetching video data acquisition request transmitted by the video data sub-processor; acquire target video data prefetched in the cache area according to the prefetching video data acquisition request; and cache at least part of the target video data to the video data sub-processor.

Because the principle of the chip to solve the problem is similar to the above method, the implementation of this chip may refer to the implementation of the method, which is not repeated here.

The systems, apparatuses, modules or units set forth in the above embodiments can be realized by computer chips or entities, or by products with certain functions. A typical implementation device is a computer device. In some embodiments, the computer device may be, for example, a personal computer, a laptop computer, a cellular phone, a camera phone, a smart phone, a personal digital assistant, a media player, a navigation device, an email device, a game console, a tablet computer, a wearable device or a combination of any of these devices.

In a typical example, a computer device may include a memory, a processor, and a computer program stored in the memory and executable on the processor. The processor implements the method executed by the client as described above when the processor executes the program, or the processor implements the method executed by the server as described above when the processor executes the program.

Figure 15:
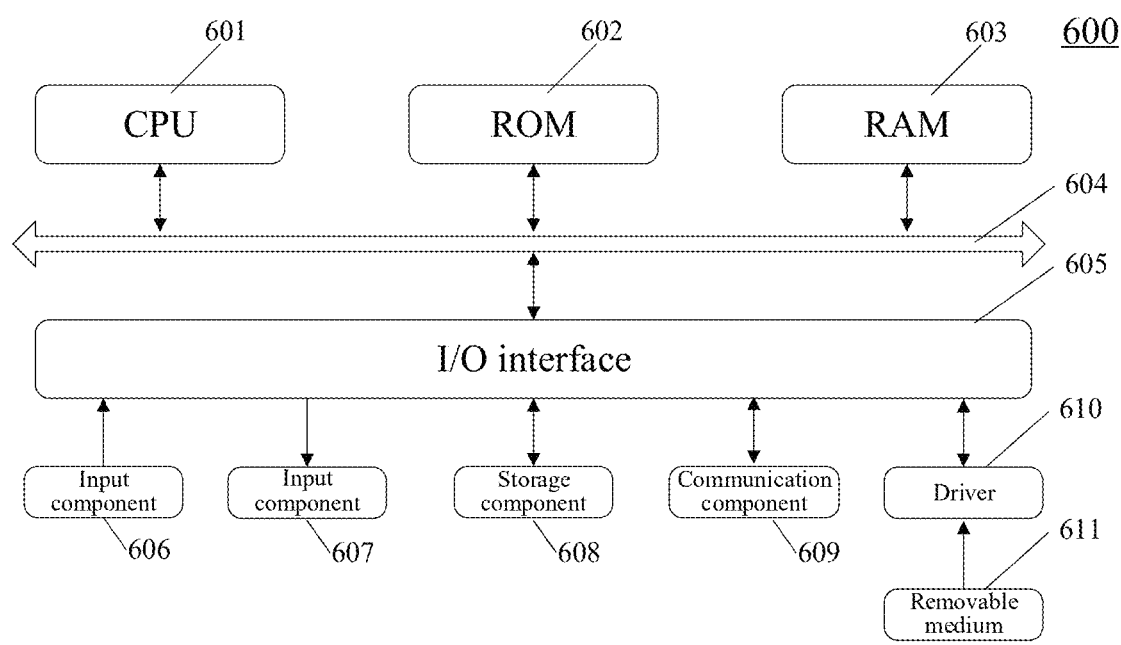
FIG. 15 is a schematic structural diagram of a computer device suitable for implementing an embodiment of the present application.

Reference is now made to FIG. 15, which shows a schematic structural diagram of a computer device 600 suitable for implementing an embodiment of the present application.

As shown in FIG. 15, a computer device 600 includes a Central Processing Unit (CPU) 601, which can perform various appropriate tasks and processes according to a program stored in a Read-Only Memory (ROM) 602 or a program loaded into a Random-Access Memory (RAM) 603 from a storage component 608. In the RAM 603, various programs and data required for system operation are also stored. The CPU 601, the ROM 602, and the RAM 603 are connected with each other through a bus 604. An input/output (I/O) interface 605 is also connected with the bus 604.

The following components are connected with the I/O interface 605: an input component 606 including a keyboard, a mouse, or the like; an output component 607 including a Cathode Ray Tube (CRT), a Liquid crystal display (LCD), a speaker, or the like; a storage component 608 including a hard disk or the like; and a communication component 609 including a network interface card such as a LAN card, a modem, etc. The communication component 609 performs communication processing via a network such as the Internet. A driver 610 is also connected with the I/O interface 605 as needed. A removable medium 611, such as a magnetic disk, an optical disk, a magneto-optical disk, a semiconductor memory, etc., is installed on the driver 610 as needed, so that a computer program read from it can be installed in, for example, the storage component 608 as needed.

In particular, according to an embodiment of the present application, the process described above with reference to the flowchart can be implemented as a computer software program. For example, an embodiment of the present application provides a computer program product, which includes a computer program tangibly embodied on a machine-readable medium, and the computer program includes program code for executing the method shown in the flowchart. In such an embodiment, the computer program can be downloaded and installed from the network through the communication component 609 and/or installed from the removable medium 611.

Computer-readable media, including permanent and non-permanent, removable and non-removable media, can store information by any method or technology. Information can be computer-readable instructions, data structures, and modules of programs or other data. Examples of computer storage media include, but are not limited to, Phase Change RAM (PRAM), Static Random-Access Memory (SRAM), Dynamic Random Access Memory (DRAM), other types of Random Access Memory (RAM), Read-Only Memory (ROM), Electrically Erasable Programmable Read-Only Memory (EEPROM), flash memory or other memory technologies, Compact disc read-only memory (CD-ROM), Digital Videodisk (DVD) or other optical storage, magnetic cassettes, magnetic tape and disk storage or other magnetic storage devices or any other non-transmission media, which can be used to store information that can be accessed by computing devices. According to the definition in the present application, the computer-readable media does not include a temporary computer-readable media, such as modulated data signals and carrier waves.

For the convenience of description, when describing the above apparatus, the apparatus is divided into various units to describe separately based on functions. Of course, the functions of each unit can be realized in one or more pieces of software and/or hardware when the present application is implemented.

The present application is described with reference to flowcharts and/or block diagrams of methods, devices (systems), and computer program products according to embodiments of the present application. It should be understood that each flow and/or block in the flowchart and/or block diagram, and combinations of the flow and/or block in the flowchart and/or block diagram can be implemented by computer program instructions. These computer program instructions may be provided to a processor of a general-purpose computer, a special-purpose computer, an embedded processor or other programmable data processing devices to produce a machine, such that the instructions which are executed by the processor of the computer or other programmable data processing device produce means for implementing the functions specified in a flow or flows of the flowchart and/or a block or blocks in the block diagram.

These computer program instructions may also be stored in a computer-readable memory that can direct a computer or other programmable data processing device to function in a particular manner, such that the instructions stored in the computer-readable memory produce a manufactured article including instruction means, where the instruction means implements the functions specified in a flow or flows of the flowchart and/or a block or blocks of the block diagram.

These computer program instructions may also be loaded onto a computer or other programmable data processing device, such that a series of operational steps are performed on the computer or other programmable device to produce a computer-implemented process, such that the instructions executed on the computer or other programmable device provide steps for implementing the functions specified in a flow or flows of the flowchart and/or a block or blocks of the block diagram.

It should also be noted that the terms "comprising", "including" or any other variation thereof are intended to cover non-exclusive inclusion, so that a process, method, product or device including a series of elements includes not only those elements, but also other elements not explicitly listed, or elements inherent to such process, method, product or device. Without more restrictions, an element defined by the phrase "including a" does not exclude the existence of other identical elements in the process, method, product or device including the element.

It should be understood by those skilled in the art that the embodiments of the present application can be provided as a method, system or computer program product. Therefore, the present application can take the form of an entirely hardware embodiment, an entirely software embodiment or an embodiment combining software and hardware aspects. Moreover, the present application can take the form of a computer program product implemented on one or more computer-usable storage media (including but not limited to disk storage, CD-ROM, optical storage, etc.) containing computer-usable program codes.

The present application may be described in the general context of computer-executable instructions, such as program modules, being executed by a computer. Generally, program modules include routines, programs, objects, components, data structures, etc. that perform particular tasks or implement particular abstract data types. The present application may also be practiced in distributed computing environments where tasks are performed by remote processing devices that are connected through a communication network. In a distributed computing environment, program modules may be located in local and remote computer storage media including storage devices.

Each embodiment in the present application is described in a progressive way, and the same and similar parts between the embodiments can be referred to each other, and each embodiment focuses on the differences from other embodiments. Especially, for the chip embodiment, because it is basically similar to the method embodiment, the description is relatively simple, and the relevant contents can be found in part of the description of the method embodiment.

The above is only an example of the present application, and is not used to limit the present application. Various modifications and variations will occur to those skilled in the art. Any modification, equivalent substitution, improvement, etc. made within the spirit and principle of the present application should be included in the scope of the claims of the present application.

The invention claimed is:

1. A data caching method, being applied to a chip, wherein the chip comprising a plurality of video data sub-processors for caching different data types of video data respectively and a data prefetcher, and the method comprising:
   determining target video data according to identification information of a video data sub-processor of to-be-cached video data;
   determining a data storage address of the target video data in an external memory; and
   obtaining, by the data prefetcher, corresponding target video data from the external memory according to the data storage address;
   wherein determining the target video data according to the identification information of the video data sub-processor of the to-be-cached video data comprises:
   determining a data type according to the identification information of the video data sub-processor of the to-be-cached video data;
   determining a data format and a prefetching data amount according to the data type; and
   determining the target video data to be obtained according to the data format and the prefetching data amount.

2. The data caching method according to claim 1, further comprising:
   storing at least part of the target video data to a data prefetcher corresponding to the video data sub-processor.

3. The data caching method according to claim 2, wherein the target video data comprises the to-be-cached video data and prefetching video data, the data prefetcher comprises a chip system-level cache and a video system-level cache, and the method further comprising:
   storing the to-be-cached video data in the target video data to a corresponding video data sub-processor and/or video system-level cache, and
   storing the prefetching video data in the target video data to a corresponding chip system-level cache and/or video system-level cache.

4. The data caching method according to claim 3, wherein obtaining the corresponding target video data from the external memory according to the data storage address comprises:
   generating, by the video system-level cache, a data acquisition request according to the data storage address and sending, by the video system-level cache, the data acquisition request to the chip system-level cache; and
   acquiring, by the chip system-level cache, video data in the data storage address from the external memory according to the data acquisition request to obtain the target video data.

5. The data caching method according to claim 3, wherein storing the to-be-cached video data in the target video data to the corresponding video data sub-processor and/or video system-level cache, and storing the prefetching video data in the target video data to the corresponding chip system-level cache and/or video system-level cache comprises:
   determining a replacement algorithm according to the identification information; and
   according to the replacement algorithm, storing the to-be-cached video data in the target video data to the corresponding video data sub-processor and/or video system-level cache, and storing the prefetching video data in the target video data to the corresponding chip system-level cache and/or video system-level cache.

6. The data caching method according to claim 2, wherein the method further comprising:
   according to a prefetching video data acquisition request transmitted by a video data sub-processor, determining a cache area in the data prefetcher corresponding to the video data sub-processor;
   acquiring target video data prefetched in the cache area according to the prefetching video data acquisition request; and
   caching at least part of the target video data to the video data sub-processor.

7. The data caching method according to claim 1, wherein the data type comprises a three-dimensional space linear horizontal increasing type, and determining the data format and the prefetching data amount according to the data type comprises:
   determining the data format according to the data type; and determining the prefetching data amount according to the data format and a specified horizontal step size and data amount of the three-dimensional space linear horizontal increasing type.

8. The data caching method according to claim 7, wherein the target video data comprises the to-be-cached video data and prefetching video data, the data prefetcher comprises a chip system-level cache and a video system-level cache, and the method further comprising:

storing the to-be-cached video data in the target video data to a corresponding video system-level cache; and storing the prefetching video data in the target video data to a corresponding video system-level cache.

9. The data caching method according to claim 1, wherein the data type comprises a three-dimensional space adjacent dependency type, and determining the data format and the prefetching data amount according to the data type comprises:

determining the data format according to the data type; and determining the prefetching data amount according to the data format and a specified adjacent orientation of the three-dimensional space adjacent dependency type.

10. The data caching method according to claim 9, wherein the target video data comprises the to-be-cached video data and prefetching video data, the data prefetcher comprises a chip system-level cache and a video system-level cache, and the method further comprising:

storing the to-be-cached video data in the target video data to a corresponding video system-level cache; and storing the prefetching video data in the target video data to a corresponding video system-level cache.

11. The data caching method according to claim 1, wherein the data type comprises a finite three-dimensional space mutation type, and determining the data format and the prefetching data amount according to the data type comprises:

determining the data format according to the data type; and determining the prefetching data amount according to the data format and a mutation address of the finite three-dimensional space mutation type.

12. The data caching method according to claim 11, wherein the target video data comprises the to-be-cached video data and prefetching video data, the data prefetcher comprises a chip system-level cache and a video system-level cache, and the method further comprising:

storing the to-be-cached video data in the target video data to a corresponding video system-level cache; and storing the prefetching video data in the target video data to a corresponding chip system-level cache.

13. A chip, comprising a plurality of video data sub-processors for caching different data types of video data respectively, a central controller and a data prefetcher;

the central controller is configured to determine target video data according to identification information of a video data sub-processor of to-be-cached video data; and determine a data storage address of the target video data in an external memory; wherein determining the target video data according to the identification information of the video data sub-processor of the to-be-cached video data comprises: determining a data type according to the identification information of the video data sub-processor of the to-be-cached video data; determining a data format and a prefetching data amount according to the data type; and determining the target video data to be obtained according to the data format and the prefetching data amount; and the data prefetcher is configured to obtain corresponding target video data from the external memory according to the data storage address.

14. A computer device, comprising a memory, a processor and a computer program stored in the memory and executable on the processor, wherein the processor implements the method according to claim 1 when executing the computer program.

15. A non-transitory computer-readable storage medium storing a computer program, wherein the computer program is executed by a processor to implement the method according to claim 1.

* * * * *